(12) United States Patent
Tullis

(10) Patent No.: US 7,256,820 B2
(45) Date of Patent: Aug. 14, 2007

(54) WIRELESS HAND-HELD DIGITAL CAMERA

(75) Inventor: Barclay J. Tullis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 10/198,506

(22) Filed: Jul. 18, 2002

(65) Prior Publication Data
US 2002/0171737 A1 Nov. 21, 2002

Related U.S. Application Data

(63) Continuation of application No. 09/003,265, filed on Jan. 6, 1998, now Pat. No. 6,535,243.

(51) Int. Cl.
H04N 5/225 (2006.01)
H04N 5/232 (2006.01)

(52) U.S. Cl. ............... 348/207.1; 348/207.11; 348/211.2; 348/211.99; 348/211.1

(58) Field of Classification Search ........... 348/207.11, 348/207.1, 211.2, 211.99, 211.1, 211.14
See application file for complete search history.

(56) References Cited

U.S. PATENT DOCUMENTS

| 4,097,893 | A | | 6/1978 | Camras | |
|---|---|---|---|---|---|
| 5,264,935 | A | | 11/1993 | Nakajima | |
| 5,432,871 | A | | 7/1995 | Novik | |
| 5,475,441 | A | * | 12/1995 | Parulski et al. ............. | 348/552 |
| 5,550,646 | A | | 8/1996 | Hassan et al. | |
| 5,579,239 | A | | 11/1996 | Freeman et al. | |
| 5,806,005 | A | * | 9/1998 | Hull et al. ................... | 455/566 |
| 5,835,721 | A | * | 11/1998 | Donahue et al. ............ | 709/224 |
| 5,845,166 | A | | 12/1998 | Fellegara et al. | |
| 5,880,777 | A | * | 3/1999 | Savoye et al. ........... | 348/217.1 |
| 5,893,037 | A | | 4/1999 | Reele et al. | |
| 5,900,947 | A | * | 5/1999 | Kenmochi et al. .......... | 358/442 |
| 6,104,430 | A | | 8/2000 | Fukuoka | |
| 6,111,863 | A | | 8/2000 | Rostoker et al. | |
| 6,396,537 | B1 | * | 5/2002 | Squilla et al. ............... | 348/239 |
| 6,784,924 | B2 | * | 8/2004 | Ward et al. ............... | 348/207.1 |
| 2002/0190923 | A1 | * | 12/2002 | Ronzani et al. ................ | 345/50 |

* cited by examiner

Primary Examiner—Vivek Srivastava
Assistant Examiner—James M. Hannett

(57) ABSTRACT

A method and system allow a hand-held digital camera to access and store large volumes of digital image data utilizing a wireless communications link between a host computer and the camera. In an embodiment of the invention, imaging optics and a photosensor array capture image data that represents an image of a subject. A transceiver integrated into the hand-held digital camera then transmits the image data to a host computer via a wireless communications link. The host computer stores the image data, or a copy of the image data, and retransmits related image data or, alternatively, the same image data back to the hand-held digital camera via the wireless communications link. Once the image data is received by the hand-held digital camera, an electronic image is formed by a display device that is integrated into the camera. The host computer may process the digital image data into enhanced digital image, thereby enabling the camera to display an enhanced electronic image of a subject. The communications link between the hand-held digital camera and the host computer can transfer data at a sufficiently high bandwidth to provide virtually real-time feedback to a computer operator.

20 Claims, 3 Drawing Sheets

WIRELESS HAND-HELD DIGITAL CAMERA

This is a continuation of application Ser. No. 09/003,265 filed on Jan. 6, 1998 now U.S. Pat. No. 6,535,243 which is hereby incorporated by reference herein.

TECHNICAL FIELD

The invention relates to digital cameras and more specifically to a digital camera system that provides remote storage and image enhancement combined with an in-camera display device.

BACKGROUND ART

A digital camera captures an image of a particular subject using an imaging system that includes an optical lens and a photosensor array, such as a charged coupled device (CCD). The imaging system "captures" a set, or frame, of digital image data that represents a particular subject at the time that the frame is captured. Each frame of digital image data can be stored in a memory for subsequent viewing on a display, printing onto paper, or downloading to a computer system. Because of the inherent space limitations of a hand-held digital camera, memory capacity for storing frames of digital image data within the camera is limited.

In addition to having storage capability, hand-held digital cameras are able to process digital image data to enhance the resolution and overall quality of an image that is presented to a viewer. In order to perform increasingly complex image enhancements, additional processing capability is required on-board a hand-held digital camera, but because of the inherent space limitations of hand-held digital cameras, processing capability is limited.

Hand-held digital cameras are available in which a still image of a subject can be viewed from a display device located within the hand-held digital camera. In hand-held digital cameras with image display capability, the problems of memory and processing limitations are magnified.

One technique used to overcome the memory limitations of hand-held digital cameras is disclosed in U.S. Pat. No. 5,534,921, entitled "CCD Digital Camera System With Selectable Memories," issued to Sawanobori. In the Sawanobori patent, a detachable memory card is inserted into a hand-held digital camera and digital image data is transferred to the memory card. When the storage capacity of the memory card is reached, the memory card can be removed from the camera and replaced with a new memory card. A concern with the Sawanobori technique is that the memory cards themselves have limited storage capacity. A second concern is that the memory cards must be manually replaced when memory capacity is reached, creating a delay and a distraction to the operator of a hand-held digital camera.

Another technique that is employed to address the memory limitations of hand-held digital cameras is disclosed in U.S. Pat. No. 5,402,170 entitled "Hand-Manipulated Electronic Camera Tethered To A Personal Computer," issued to Parulski et al. (hereinafter '170). In the '170 patent, an electronic camera is linked to a computer by a cable and an interface protocol is utilized to allow the camera to transmit image data over the cable and into a memory device of the computer. Disadvantages of the technique are that the hand-held digital camera must be "tethered" to the computer by a cable in order to accomplish data storage and that the technique only allows data transfer in one direction, from the camera to the computer, eliminating the possibility of viewing previously stored images on the display device of the hand-held digital camera.

A technique for overcoming the memory limitations involving the wireless transmission of electronic image data from an electronic hand-held camera is disclosed in U.S. Pat. No. 5,666,159, entitled "Electronic Camera System With Programable Transmission Capability," issued to Parulski (hereinafter '159). In the '159 patent, an electronic camera is detachably coupled to a portable computer that has a display module and a radio-frequency transmitter module. The system is able to transmit electronic image data to a selected base unit using standard wireless communications techniques. While the technique is intended to be used to send facsimile images of a subject to a fax machine, the technique can be adapted to allow corresponding facsimile image data to be stored in a properly equipped computer. A disadvantage of the technique is that image data is transferred in only one direction, from the camera/computer combination to a base unit. Another example of a wireless transmission technique used to transmit electronic image data is disclosed in U.S. Pat. No. 5,475,441, entitled "Electronic Camera With Memory Card Interface To A Computer," issued to Parulski et al (hereinafter '441). In the '441 patent, electronic image data is transmitted from an electronic hand-held camera with no display capability to a computer via a wireless transmission link. The computer that receives the data is relied upon to perform image processing, image data storage, and image display. While the '441 patent provides a high speed interface for transferring image data from a hand-held camera to a computer, a disadvantage of the '441 patent is that the hand-held camera does not have image display capability and the interface does not allow image data that is stored on the computer to be transmitted back to the hand-held camera for viewing.

What is needed is a hand-held digital camera system that has a built-in image display device and high capacity image data storage. In addition, what is need is a hand-held digital camera system that can display high quality images for viewing immediately after an image is captured.

SUMMARY OF THE INVENTION

A method and system allow a hand-held digital camera to have continuous access to large volumes of digital image data utilizing a bi-directional wireless communications link between a host computer and the camera. In an embodiment of the invention, imaging optics and a photosensor array capture image data that represents an image of a subject. A transceiver integrated into the hand-held digital camera transmits the image data to a host computer via a wireless communications link. The host computer stores the image data, or a copy of the image data, and retransmits the image data back to the hand-held digital camera via the wireless communications link. Once the image data is received by the hand-held digital camera, an electronic image representative of the image data is displayed by a display device that is integrated into the camera. The communications link between the hand-held digital camera and the host computer can transfer data at a sufficiently high rate to provide virtually real-time feedback to a camera operator.

In a preferred embodiment of the invention, when the image data is received at the host computer, the image data is processed by an image processor within the host computer in order to enhance the quality of the image data that was initially captured by the hand-held digital camera. Enhancements in the image data may include applying mathematical algorithms to generate greater pixel density or adjusting color balance, contrast, and/or luminance. Once the improved image data is generated by the image processor of the host computer, the host computer transmits the improved image data to the hand-held digital camera. The hand-held digital camera receives the improved image data and forms an enhanced electronic image that is displayed on the display device of the camera. The bi-directional communications link and the processing speed of the host computer enable virtually real-time feedback to a camera operator. The improved data may consist of image correction data or it may contain an entire array of image data. In addition, the improved image data may be made responsive to user-defined criteria that may include morphing, distortion, changes in perspective, and other artistic enhancements.

In addition to displaying images that have just been captured by the hand-held digital camera, the camera can display previously captured images by accessing image data that is stored in the host computer. For example, the hand-held digital camera can access and display an image that was captured the previous day, since the data is stored in the host computer.

An advantage of the hand-held digital camera is that the camera can display just-captured images in nearly real-time, while having continuous and wireless access to a large image data storage capacity that allows viewing of previously captured images. The hand-held digital camera also provides the capability of comparing captured images to images in an image database and displaying certain stored images that meet user-specified similarity criteria. In addition, stored global positioning system (GPS) data concerning camera position and even orientation can enable the display of previously captured images having similar associated attributes.

Another advantage is that processing performance required to display high quality images is not limited by the processing capability of the hand-held digital camera, but by the processing capability of the host computer. The processing capability of the host computer allows the host computer to improve captured image data well beyond the practical capabilities of a hand-held digital camera. Another advantage of the hand-held digital camera is that the camera does not require removable memory cards which must be frequently exchanged and the camera is not "tethered" to a host computer by a data cable.

DETAILED DESCRIPTION

Figure 1:
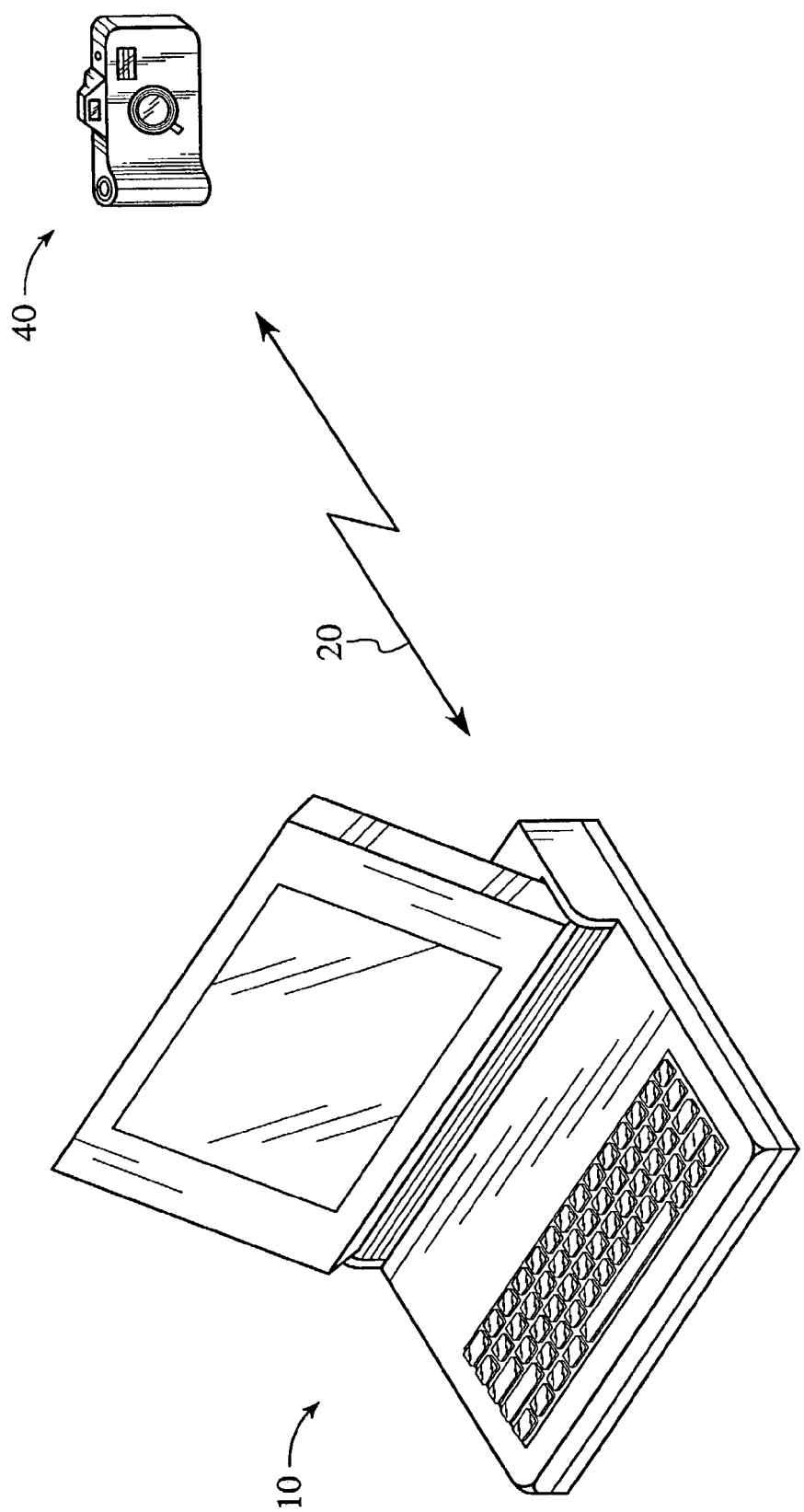
FIG. 1 is an illustration of a hand-held digital camera in wireless communication with an adapted host computer in accordance with the present invention.
Figure 2:
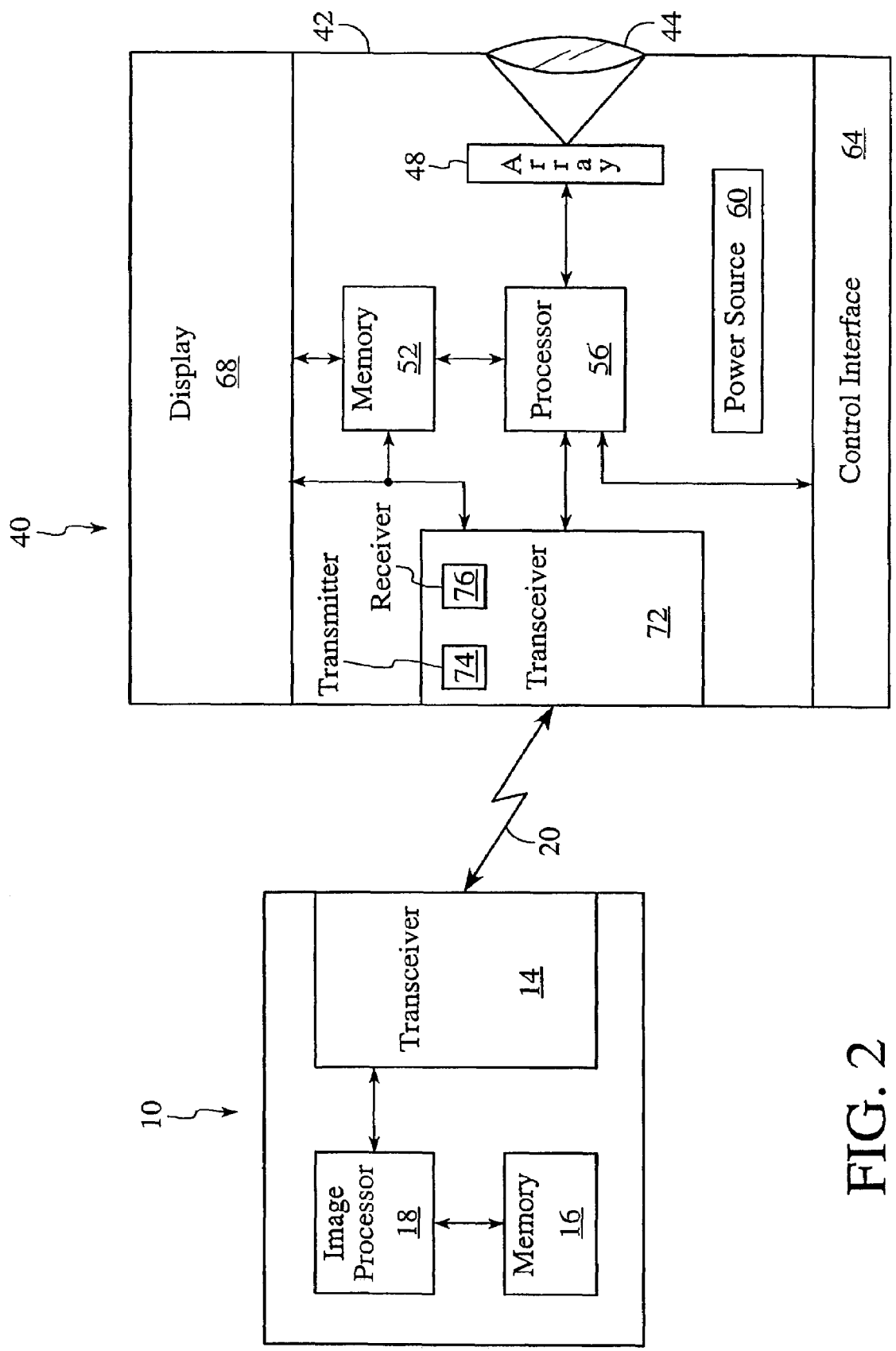
FIG. 2 is a block diagram of the components of the hand-held digital camera and the adapted host computer of FIG. 1 in accordance with the present invention.

FIG. 1 is an illustration of a hand-held digital camera 40 that is linked to a portable computer 10 by a wireless communications link 20 which may include segments of wire, cable, optical fiber, or other physical connections to complete the wireless link. The components of the hand-held digital camera 40 and the host computer 10 are shown in FIG. 2. Integrated into a housing 42 of the hand-held digital camera are imaging optics 44 that may include a single lens or a lens array positioned to collect optical energy representative of a subject or scenery, and to focus the optical energy onto a photosensor array 48. In addition to a lens or lens system, color filters may be placed between the imaging optics and the photosensor array to achieve desired color manipulation.

The photosensor array 48 defines a matrix of photosensitive pixels. Each photosensitive pixel generates an electrical signal that is representative of the optical energy that is directed at the pixel by the imaging optics. The resolution of an image that can be produced from a photosensor array directly relates to the density of photosensitive pixels in the photosensor array. The electrical signals that are output by the photosensor array are characterized as image data or digital image data, wherein each image or "picture" that is captured is considered one "set" or "frame" of digital image data. In the preferred embodiment, the photosensor array is a charged coupled device (CCD).

A processor 56 that is in data transfer communication with the photosensor array 48 is also integrated into the hand-held digital camera 40. The processor performs data management functions within the hand-held digital camera and is also able to perform limited processing on raw digital image data in order to enhance the quality of the raw digital image data. Processing of the image data may include performing data compression in order to decrease the quantity of data that is transmitted or stored and data decompression to display previously compressed data. This processing may include run length encoding and/or delta modulation.

Memory 52 that is in data transfer communication with the processor 56 is also integrated into the hand-held digital camera 40. In the preferred embodiment, the camera memory is electronic memory, such as flash memory, that can be used to store frames of digital image data. The camera memory can be used to buffer digital image data before the digital image data is displayed and/or processed. The memory may have a capacity of, for example, 2 megabytes, allowing storage of dozens of pictures. In alternative embodiments, the built-in memory of the hand-held digital camera may be augmented by removable memory, or the camera may have removable memory completely substituted for built-in memory. In other alternative embodiments, the memory may be other than electronic memory, for example magnetic memory.

A power source 60 is contained within the hand-held digital camera 40 to operate the electronic components of the camera. The power source may be conventional alkaline batteries, such as AA size batteries, or rechargeable nickel-cadmium batteries.

A control interface 64 is included in the hand-held digital camera 40 to allow an operator to control the functions of the camera. Interface functions of the hand-held digital camera may include an on/off switch, an image capture switch, a battery status readout, image display option controllers, and controllers for lens focus, exposure, and shutter speed. The control interface may also include selections for requesting desired image enhancements from the host computer.

A display device 68 is also integrated into the hand-held digital camera 40. The display device may be, for example, a liquid crystal display (LCD) or a thin-film transistor (TFT) display, and the resolution of the display device is related to the number of pixels in the fixed display area. The display device allows a camera operator to view an image that has been captured, so that the camera operator has real-time feedback on the imaging process. In addition to displaying a single image, the display device may be able to display more than one image at a time, allowing the operator to compare multiple images side-by-side. In an alternative embodiment, the display device need not be integrated into the camera housing 42 but may be external to the camera, such as viewing goggles or a remote display.

In an alternative embodiment of the hand-held digital camera 40, image data displayed on the display device 68 is dynamically dithered to allow the displayed image to appear to have higher resolution and quality than would otherwise be expected from the display device.

A camera transceiver 72 is also associated with the hand-held digital camera 40, preferably integrated into the hand-held digital camera housing 42, and is connected such that the transceiver can transfer data to and from the processor 56, the memory 52, and the display device 68 of the camera. The camera transceiver has a transmitter portion 74 and a receiver portion 76 for transferring data over a wireless communications link between the camera transceiver and a compatible transceiver. The camera transceiver may include an infrared transmission system or a radio-frequency (RF) transmission system. In an RF system, the full 1.25 megahertz (MHz) bandwidth of the IS-95 Mobile Radio Standard can be used. The IS-95 Mobile Radio Standard is a service using Code Division Multiple Access (CDMA) and Quadrature Phase Shift-Keying (QPSK)/Bipolar Phase Shift-Keying (BPSK) modulation on a carrier frequency of 824-994 MHz or 1.8-2.0 gigahertz (GHz). Emerging systems with much higher bandwidths on carriers upwards of 60 GHz and higher may also be used. In order to increase the bandwidth of the wireless transfer of image data between compatible transceivers, parallel code and/or parallel transmission channels may be used simultaneously. Alternatively, the camera transceiver can receive broadcast transmissions of information. For example, the host computer 10, or a network of host computers, may broadcast signals that designate the availability of the host computer. The hand-held digital camera 40 may include an annunciator device such as an indicator light showing when the host computer is within communications range.

The host computer 10 is preferably a conventional computer system that is adapted for use with a hand-held digital camera 40. The host computer may be a portable computer, a desktop computer, a super computer, or even a network of computers. As an alternative embodiment, the host computer may be a specially designed single-use computer. In any case, the host computer is remote from the hand-held digital camera in that the host computer is not physically connected to the camera.

An added component to the host computer 10 is a computer transceiver 14. The computer transceiver is compatible with the camera transceiver 72 and enables the transfer of electronic data between the hand-held digital camera 40 and the host computer over a communications link that is at least partially a wireless communications link. The computer transceiver may be internal or external to the host computer as long as the computer transceiver is in data-transfer communication with a memory 16 and an image processor 18 of the computer.

The memory 16 of the host computer 10 can be any conventional computer memory, including electronic memory and/or magnetic memory. Electronic memory may be in the form of RAM computer chips, and magnetic memory may be in the form of a magnetic disk drive. The computer memory can be used to store large quantities of image data in comparison to the storage capacity of the hand-held digital camera memory 52. Image data stored in the computer memory can be transferred to and from the computer transceiver 14 to allow rapid communication between the host computer and the hand-held digital camera 40. The memory can also store image data in a relational database format, enabling the database to be rapidly searched for related data which may include the original image data. For example, if the database is presented with an image of a horse, the database could be searched for other images of horses. In addition, images could be searched by other criteria, such as a GPS marker or an identified name.

The image processor 18 of the host computer 10 is a combination of computer hardware and software. The hardware may include a single or multiple processors and various other support circuits, while the software may include image enhancement software that operates to improve or custom tailor digital image data to create, for example, a higher resolution, better quality, or stylized image of a subject. The processor may also enable database searches for image data that is related to initially captured image data. The image processor is connected to the host computer such that digital image data can be transferred between the computer memory and the computer transceiver 14.

The image processor 18 may operate on image data by, for example, adjusting color balance, gamma and luminance, filtering device limiting fixed pattern noise, filtering noise using a Wiener filter, changing zoom factors, recropping, applying enhancement filters, applying smoothing filters, applying subject-dependent filters, and applying coordinate transformations.

Figure 3:
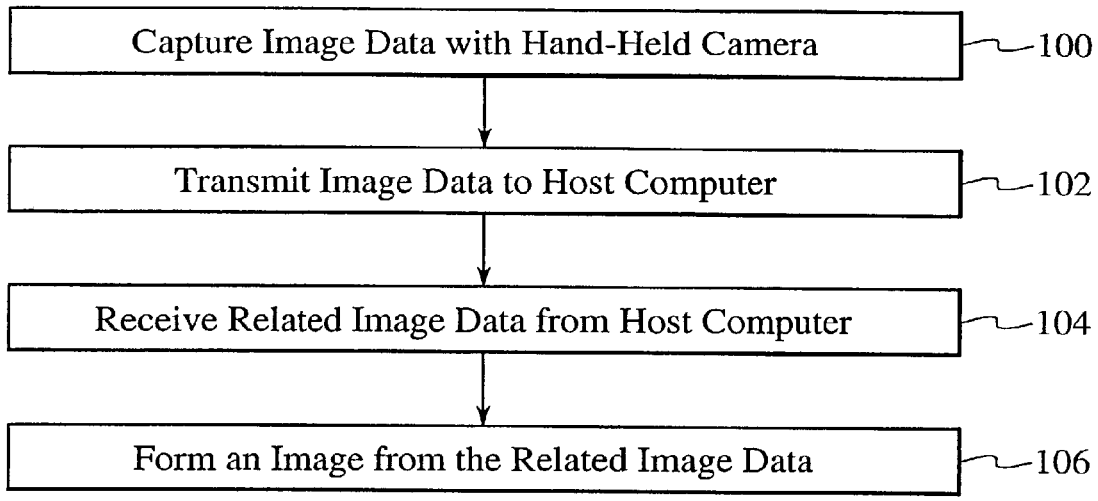
FIG. 3 is a flow diagram of a method for managing image information through a hand-held digital camera that includes storing image data in a host computer in accordance with the present invention.

Operation of a first embodiment of the invention is described with the reference to FIGS. 2 and 3. In the embodiment, the hand-held digital camera 40 is used to capture image data that represents an image of a subject. The image data is captured at step 100 by directing the camera at the subject of interest and activating an image capture button. The captured image data may be compressed by the processor 56 and is then transferred, either directly or indirectly, to the camera transceiver 72, where the image data is processed for wireless transmission to the host computer 10.

In step 102, the camera transceiver 72 transmits the image data to the host computer 10 via the at least partially wireless communications link 20 that is established between the camera transceiver and the computer transceiver 14 located within the host computer 10. The computer transceiver immediately retransmits or "echos" related image data back to the hand-held digital camera 40, where the related image data is received at step 104 by the camera via the communications link established with the camera transceiver. In response to the proper command, at step 106 the hand-held digital camera forms a related image from the related image data and displays the related image of the subject on the display device of the camera. Rapidly transmitting the related image data, via a wireless communications link, to a host computer memory enables the hand-held digital camera to store a large quantity of image data without requiring exchanges of removable memory diskettes and without having the camera physically connected to a supporting computer by a cable or a memory card.

In an alterative embodiment, the related image data that the host computer 10 sends to the hand-held digital camera 40 consists of nothing more than the original image data. In another embodiment, when the host computer initially receives the image data from the camera transceiver 72, the host computer forms a copy of the image data to store in the computer memory 16. In addition to displaying images on the camera display device, images captured by the camera may also be remotely displayed, for example, on a big screen display monitor. Remote display may allow many people to view captured images simultaneously.

Figure 4:
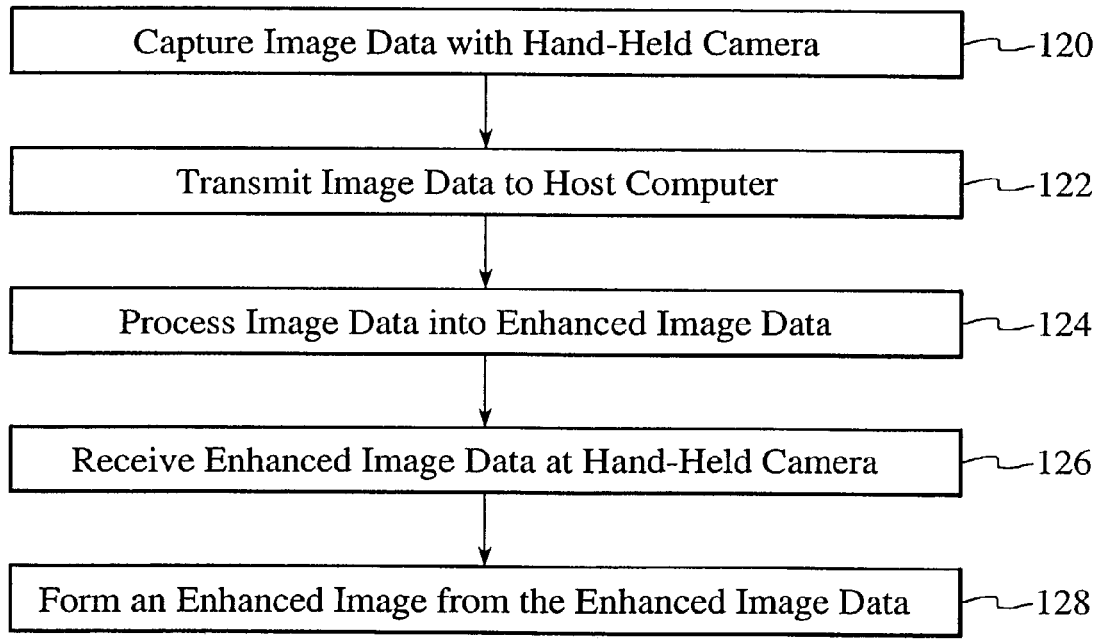
FIG. 4 is a flow diagram of a method for managing image information through a hand-held digital camera that includes processing the image data to enhance image resolution in accordance with the present invention.

Operation of a second embodiment of the invention is described with reference to FIGS. 2 and 4. In this embodiment, the hand-held digital camera 40 is used to capture image data that represents an image of a subject or scene. The image data is captured at step 120 by directing the camera at the subject or scene of interest and activating an image capture button. The captured image data is transferred, either directly or indirectly, to the camera transceiver 72 where the image data is processed for wireless transmission.

At step 122, the camera transceiver transmits the image data to the host computer 10 via the at least partially wireless communications link 20 that is established between the camera transceiver 72 and the computer transceiver 14 located within the host computer. The image processor 18 within the host computer receives the transmitted image data and at step 124 processes the image data into enhanced image data. The process of enhancing the image data is executed in continuity with the previous steps and may include performing software algorithms that operate to generate more detailed pixel information than was provided by the original image capture. Upon completion of the enhancement processing, a copy of the image data is stored in the memory 16 of the host computer. The computer transceiver 14 then transmits the enhanced image data to the hand-held digital camera, where the enhanced image data is received at step 126 by the camera via the communications link established with the camera transceiver 72. Once at the hand-held digital camera, and in response to the proper command, at step 128 an enhanced image is formed from the enhanced image data and the enhanced image is displayed on the display device of the camera.

Transmitting the raw image data to the host computer allows the host computer to perform more extensive image improvements on the image data in less time than could be practically accomplished by the internal processor of the hand-held digital camera. The improved image data allows the display device of the hand-held digital camera to display a higher resolution image. In addition to greater processing capability, the host computer can store large amounts of image data, allowing an operator to capture more images without being interrupted by memory card changes and without being burdened by the limitations of a physical data cable connected to the hand-held digital camera.

In addition to displaying images that have just been captured, the hand-held digital camera system can display previously captured images. For instance, the hand-held digital camera is able to display an image that was captured by the camera the previous day or the previous week by manipulating the control interface 64 of the camera to access the image data that is stored in the host computer 10. The hand-held digital camera and the host computer may also work together to display, on the camera display, prerecorded images based on other captured data parameters such as GPS and/or camera orientation data or the date or time of image capture. The camera and computer combination can also operate together to allow a camera operator to browse a remote image database through the camera.

Although the hand-held digital camera system is described with reference to still pictures, the system can also be applied to video data. For example, the hand-held digital camera may have video capture capability, with the captured video data being transmitted to the host computer via the wireless communications link. The host computer can then store and/or process the video data in a similar fashion to the still image data.

In an alternative embodiment of the invention, a microphone is located within the hand-held digital camera. The microphone allows the recording of sound along with the capturing of images. Voice recording can be used to annotate images as the images are captured. Voice data that is recorded by the hand-held digital camera is managed in the same manner as the image data and can be considered equivalent to the image data, except that it is collected from a microphone and output from a speaker. That is, voice or other audio data is captured using the microphone and is transmitted to the host computer, with "improved" audio data that is echoed to the hand-held digital camera being used to provide the output from the speaker or similar transducer of the hand-held digital camera. In accordance with the invention, voice data can be transmitted to the host computer for storage and/or improvement along with the image data.

What is claimed is:

1. A method of managing image information utilizing a hand-held camera comprising the steps of:

capturing a single frame of image data representative of a picture of a subject of interest utilizing an imaging device of said hand-held camera;

transmitting said single frame of image data to a host computer during a continuous session via a wireless link between said hand-held camera and said host computer, said host computer being a conventional general-use computer having programming configured to enable automated transmissions and retransmissions between said host computer and said hand-held camera;

receiving, as an automated response by said host computer to said transmitting step, related image data at said hand-held camera during said continuous session via said wireless link; and forming an image from said related image data on a display device of said hand-held camera, wherein enabling a display of said subject of interest on said display device from said image data of said single frame is dependent upon operations at said host computer to generate image information that is compatible with said display on said display device;

wherein said transmitting. receiving and forming are executed while orocessing only one frame of image data.

2. The method of claim 1 wherein said step of:

receiving said related image data includes a substep of receiving said related image data automatically echoed between said hand-held camera and said host computer.

3. The method of claim 1 wherein said step of transmitting said image data includes a substep of storing said image data at said host computer.

4. The method of claim 1 wherein said steps of:

receiving said related image data includes a substep of receiving enhanced image data, wherein said enhanced image data is generated at said host computer by processing said image data that is transmitted from said hand-held camera; and forming said image from said related image data comprises processing said enhanced image data and forming an enhanced image.

5. The method of claim 4 wherein said substep of receiving said enhanced image data is executed in continuity with said steps of transmitting said image data and forming said enhanced image, such that said enhanced image is formed at said hand-held camera in substantially real time with said capturing of said image data.

6. The method of claim 4 wherein said step of transmitting said image data includes a substep of transferring said image data to a network of processors that rapidly processes said image data into said enhanced image data.

7. The method of claim 4 wherein said step of receiving said enhanced image data comprises wirelessly inputting said image data originally captured by said hand-held camera and transmitted to said host computer for enhancement with respect to at least one of:
  adjusting said image data for color balance;
  adjusting said image data for gamma;
  adjusting luminance;
  filtering said image data; and
  changing zoom factors.

8. The method of claim 1 further including a step of buffering said image data in a memory within said hand-held camera.

9. The method of claim 1 wherein said step of transmitting said image data comprises transmitting said image data in parallel via a plurality of wireless channels and wherein said step of receiving said related image data comprises receiving said related image data in parallel transmissions via a plurality of wireless channels.

10. The method of claim 1 wherein said step of forming an image includes a substep of dynamically dithering pixel values of said related image data, thereby displaying a higher resolution image.

11. The method of claim 1 further comprising steps of:
  receiving stored image data from memory of said host computer, wherein said stored image data represents a previously captured image, including transferring first image data from said hand-held camera to said host computer as a basis for automated processing to browse a database of captured images and to select said previously captured image; and
  forming an image from said stored image data that is received from said memory.

12. The method of claim 1 further including the steps of:
  capturing audio data; and
  transferring said audio data to said host computer during said continuous session via said wireless link.

13. The method of claim 1 further including the steps of:
  receiving, as an automated response by said host computer, audio data at said hand-held camera during said continuous session via said wireless link; and
  projecting sound that is representative of said audio data from a transducer of said hand-held camera.

14. The method of claim 1 further including the step of receiving a broadcast signal via said wireless link from a broadcast signal source, said broadcast signal being specific to designating availability of said host computer for enabling said continuous session.

15. A digital image system having a host computer and a hand-held digital camera, said host computer being a conventional computer, wherein said host computer and said hand-held digital camera are co-operative in the absence of a physical connection, comprising:

an Image camera, having imaging optics and a photosensor array, said image capture module outputting a single frame of electronic image data representative of a picture of a subject;
  a camera transceiver located within said digital hand-held camera and operatively connected to said image capture module, said camera transceiver having a first input for receiving said electronic image data as only said single frame output by said image capture module and having a camera transmitter and a camera receiver for transmitting said electronic image data and for receiving related electronic image data;
  a computer transceiver located at said host computer and compatible with said camera transceiver for receiving said electronic image data and for transmitting said related electronic image data as only one related frame in a generally continuous manner by which said transmitting is an automated response to said receiving said only single frame, said host computer being a general-use computer having programming configured to enable said automated response;
  a computer memory, located within said host computer and operatively connected to said computer transceiver for storing said electronic image data and said related electronic image data;
  an image processor located within said host computer and operatively connected to said computer transceiver and said computer memory for processing said only single frame of electronic image data that is received from said camera transceiver to generate said related electronic image data that is transmitted as said automated response, said image processing being configured to adjust said electronic image data for color balance; and
  a camera display device, associated with said digital hand-held camera and operatively connected to said camera transceiver, for displaying a related image from said related electronic ,camera transceiver from said computer transceiver of said host computer, said camera display device being dependent upon said processing by said image processor of said electronic image data by said host computer for image information that is compatible with displaying an image on said camera display device.

16. A method of managing image information utilizing a hand-held camera comprising the steps of:
  capturing a single frame of image data representative of a picture of a subject of interest utilizing an imaging device of said hand-held camera;
  transmitting said single frame of image data to a host computer during a continuous session via a wireless link between said hand-held camera and said host computer, said host computer being a conventional general-use computer having programming configured to enable automated transmissions and retransmissions between said host computer and said hand-held camera;
  receiving, as an automated response by said host computer to said transmitting step, related image data at said hand-held camera during said continuous session via said wireless link;
  forming an image from said related image data on a display device of said hand-held camera wherein enabling a display of said subject of interest on said display device from said image data of said single frame is dependent upon operations at said host computer to generate image information that is compatible with said dlsplay on said display device; and retransmitting said related image data to said host computer for storage in host computer memory following said step of forming said image on said display device.

17. The method of claim 16 wherein said steps of:
receiving said related image data includes a substep of receiving enhanced image data, wherein said enhanced image data is generated at said host computer by processing said image that is transmitted from said hand-held camera; and forming said image from said related image data comprises processing said enhanced image data and forming an enhanced image.d image data that is transmitted from said hand-held camera; and forming said image from said related image data comprises processing said enhanced image data and forming an enhanced image.

18. The method of claim 17 wherein said substep of receiving said enhanced image data is executed in continuity with said steps of transmitting said image data and forming said enhanced image, such that said enhanced image is formed at said hand-held camera in substantially real time with said capturing of said image data.

19. The method of claim 17 wherein said step of transmitting said image data includes a substep of transferring said image data to a network of processors that rapidly processes said image data into said enhanced image data.

20. The method of claim 17 wherein said step of receiving said enhanced image data comprises wirelessly inputting said image data originally captured by said hand-held camera and transmitted to said host computer for enhancement with respect to at least one of:
adjusting said image data for color balance;
adjusting said image data for gamma;
adjusting luminance;
filtering said image data; and
changing zoom factors.

\* \* \* \* \*